Figure 5:
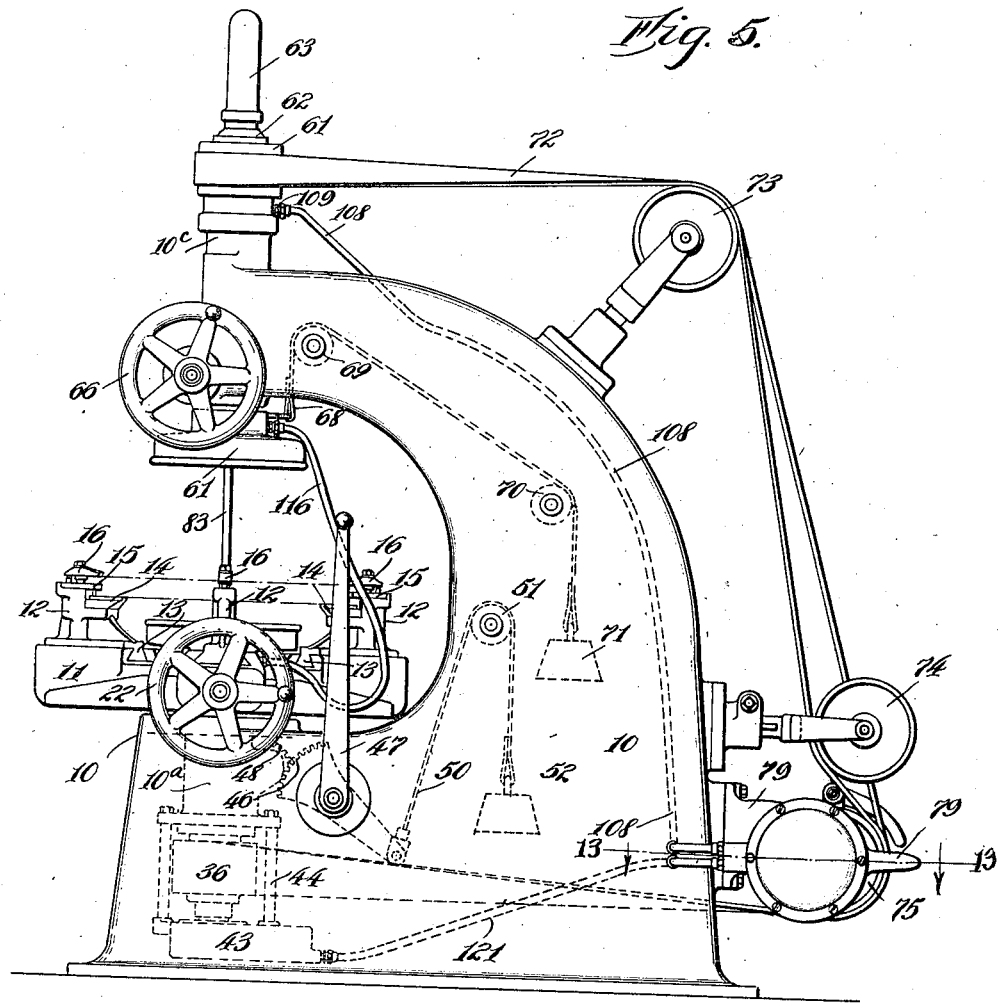

June 19, 1923.
A. E. R. BLOMQUIST
1,459,010
WHEEL MAKING MACHINE
Original Filed Aug. 12, 1916    6 Sheets-Sheet 1
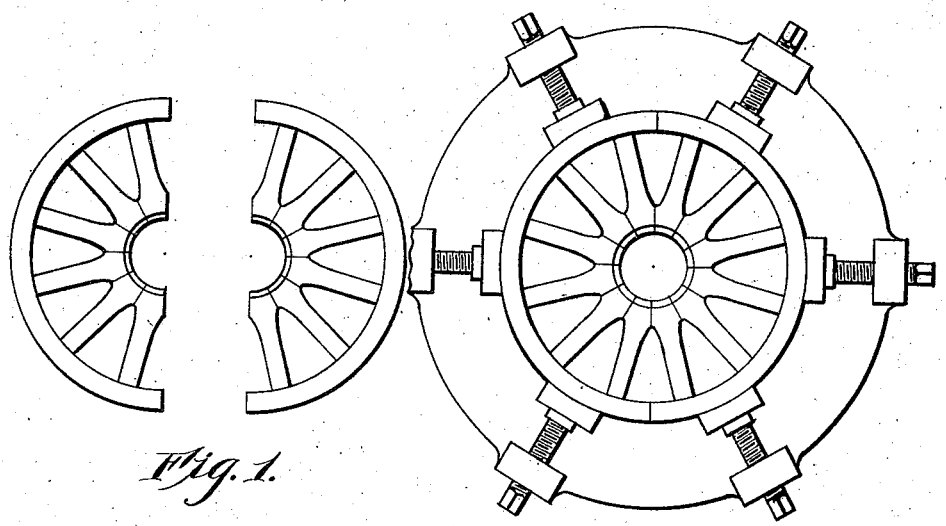
Fig. 1.
Fig. 2.
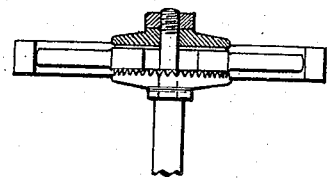
Fig. 3.
SHRINK ON
FELLY BAND.
APPLY
FINISH HUB.
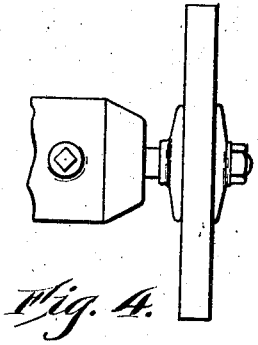
Fig. 4.
BORE CENTER HOLE
AND
SPOKES AT EACH SIDE.
FINALLY PAINT.
Inventor,
A. E. R. Blomquist
By Hull Smith Brock & West
Attys.

June 19, 1923.

A. E. R. BLOMQUIST 1,459,010

WHEEL MAKING MACHINE

Original Filed Aug. 12, 1916    6 Sheets-Sheet 2

Inventor,
A. E. R. Blomquist
By Hull Smith Brock & West
Attys.

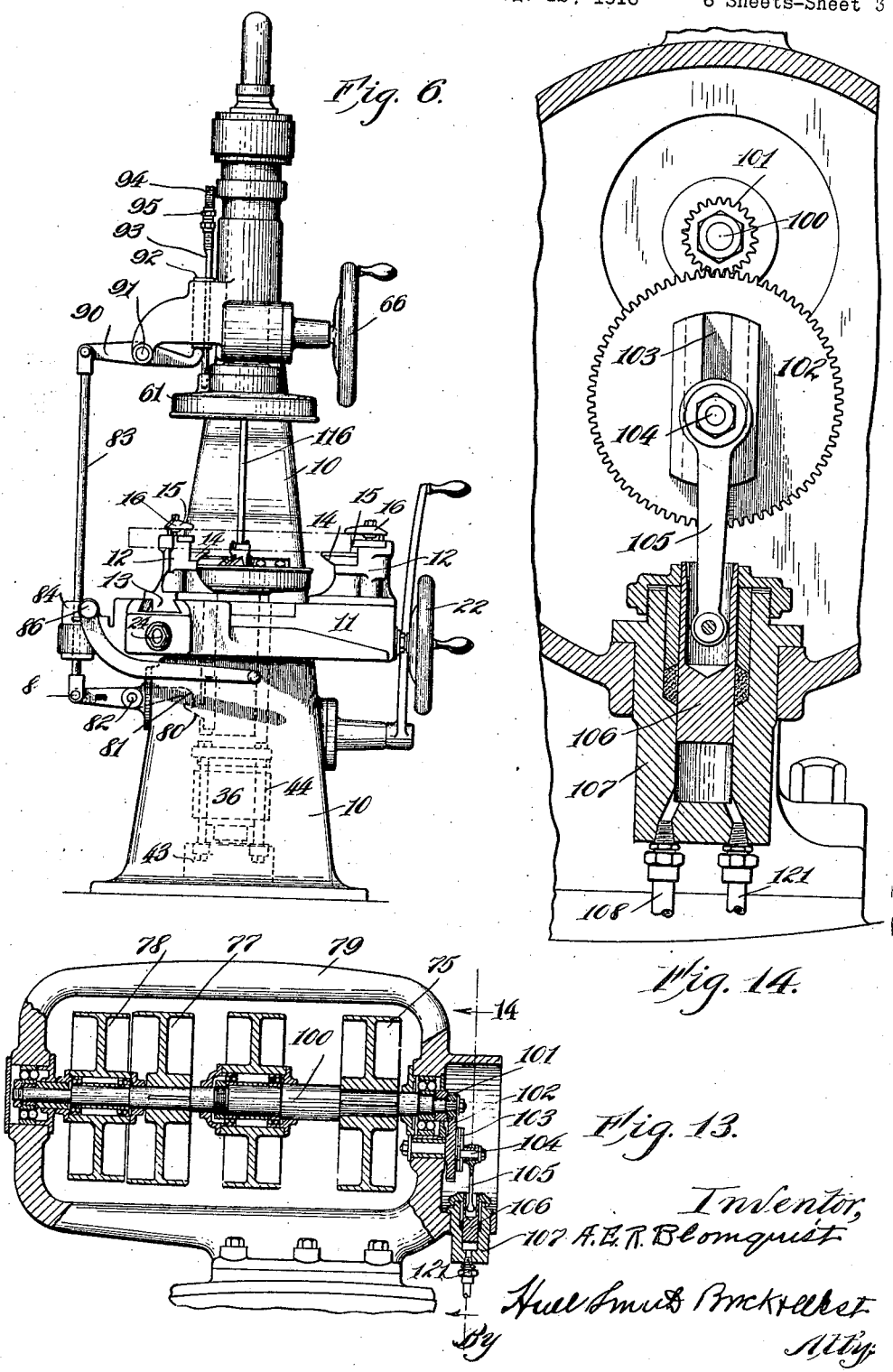

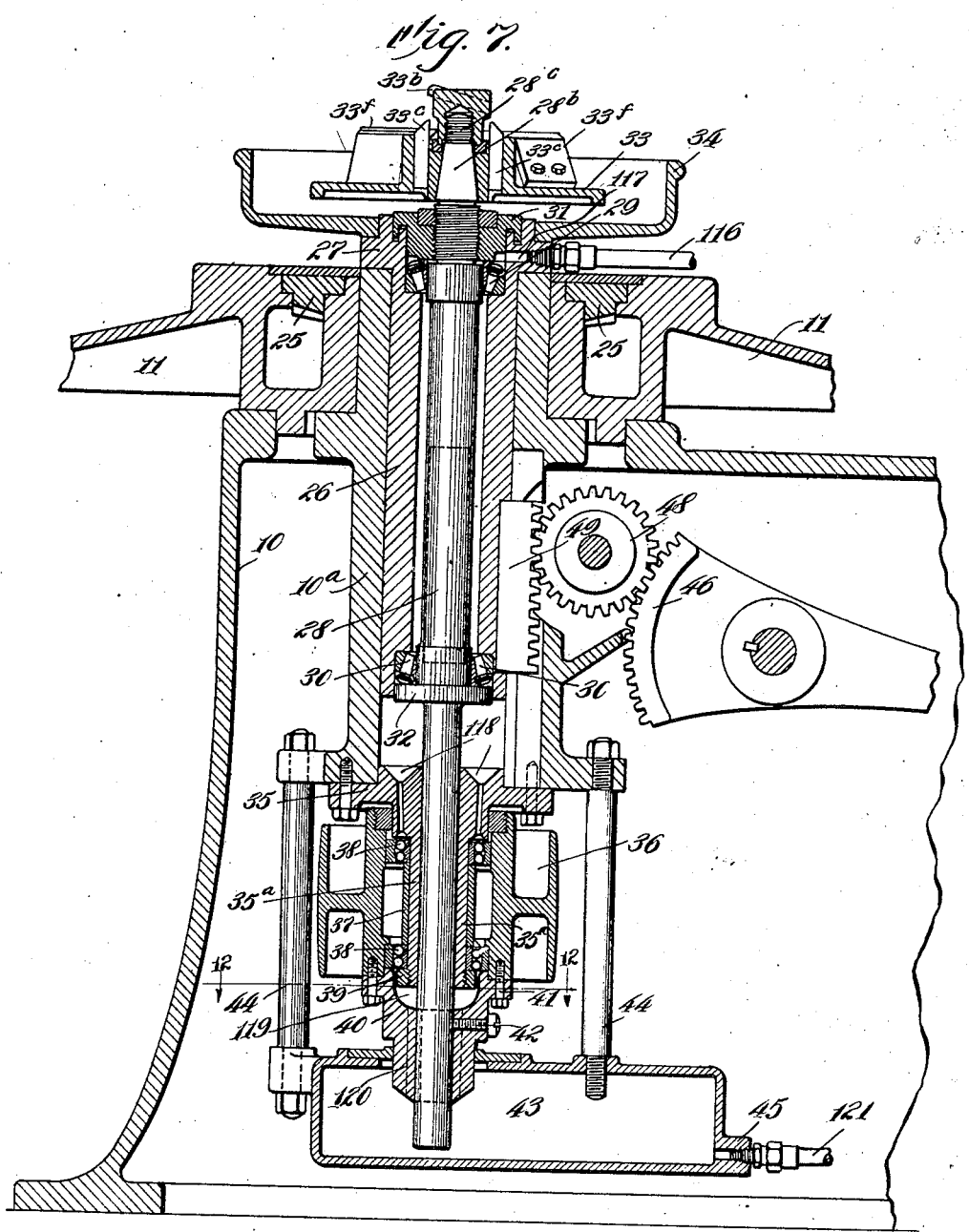

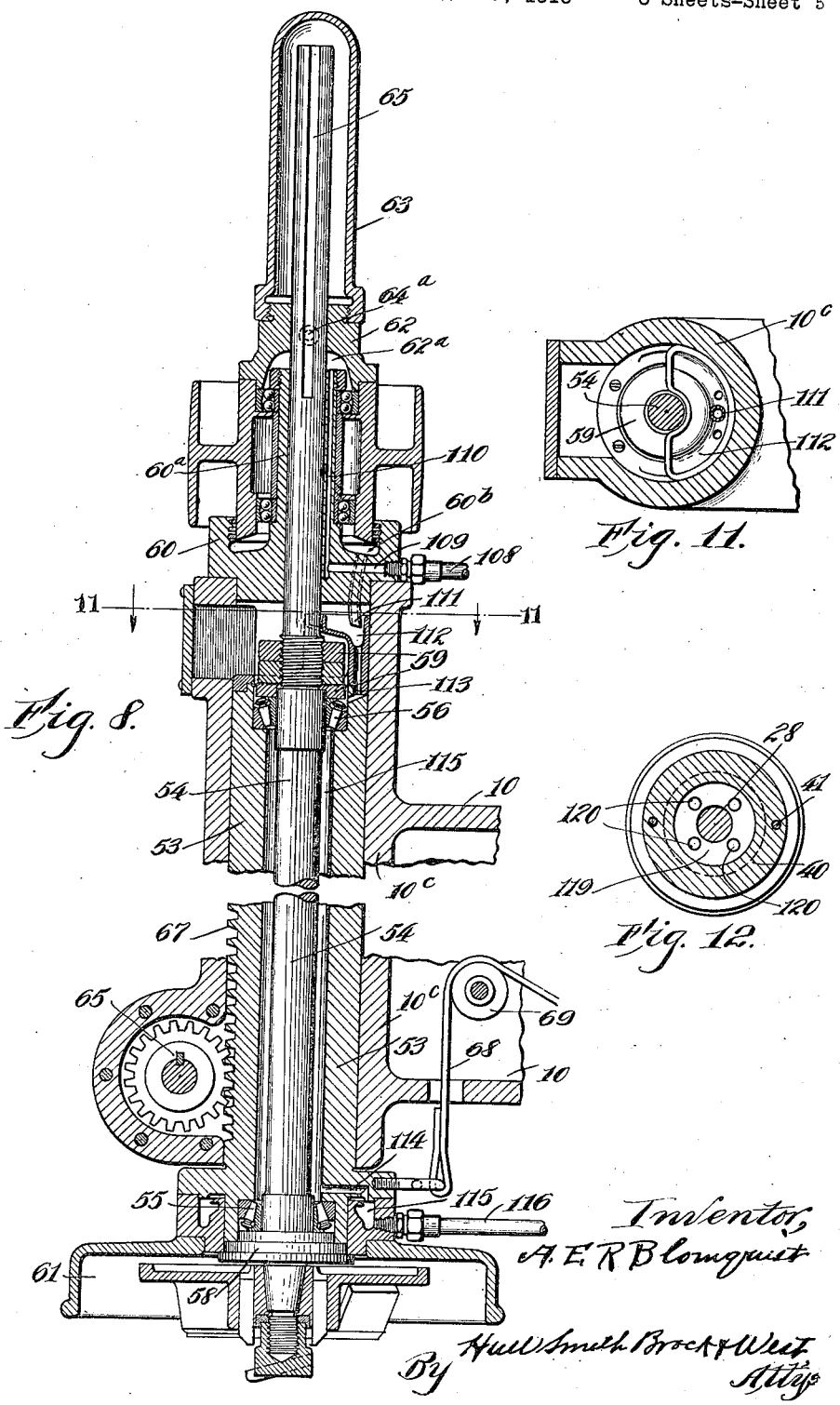

June 19, 1923.

A. E. R. BLOMQUIST 1,459,010

WHEEL MAKING MACHINE

Original Filed Aug. 12, 1916

6 Sheets-Sheet 6

Inventor,
A. E. R. Blomquist

Patented June 19, 1923.

1,459,010

UNITED STATES PATENT OFFICE.

AUGUST E. R. BLOMQUIST, OF CLEVELAND, OHIO, ASSIGNOR TO KELSEY WHEEL COMPANY, INC., OF DETROIT, MICHIGAN, A CORPORATION OF NEW YORK.

WHEEL-MAKING MACHINE.

Application filed August 12, 1916, Serial No. 114,494. Renewed September 14, 1921. Serial No. 500,708.

*To all whom it may concern:*

Be it known that I, AUGUST E. R. BLOMQUIST, a citizen of the United States, residing at Cleveland, Ohio, have invented a certain new and useful Improvement in Wheel-Making Machines, of which the following is a full, clear, and exact description, reference being had to the accompanying drawings.

This invention relates generally to wheel making machinery, and more particularly to a machine for boring the hub and facing the opposite sides thereof, preparatory to receiving the usual or any approved type of metal hub and bearings.

This machine is preferably intended to operate upon automobile wheels having the flanged metallic felly-band or tire carrying rim rigidly mounted upon the wooden felly of the wheel or upon the ends of the spokes, as the case may be.

Heretofore in the manufacture of wheels, it has been customary to assemble one half of the spokes in one half of the felly and the other half of the spokes in the other half of the felly and then place the two halves in a compression ring and fasten them together preparatory to having the fellies trimmed and faced and the felly band shrunk thereon, a false hub being employed for the purpose of maintaining the spokes in their proper central position during the various operations upon the felly or outer portions of the wheel, and this false hub is then removed and the hub portion of the wheel properly bored and faced upon both sides.

In machines as usually constructed for this boring and facing operation there has been employed only one cutter head or rotary cutter which has been brought into contact with one face of the wheel for the purpose of facing the same, the wheel being rigidly supported or clamped during such operation. After one face of the wheel had been operated upon it was necessary to unclamp or unfasten the wheel, reverse the same, and refasten preparatory to bringing the cutter head into engagement with the opposite face of the wheel.

This method of facing wheels has been found objectionable for the reason that it was almost impossible to face the opposite sides exactly the same amount and leave all of the wheels of uniform thickness at the central portion. This uniform thickness at the central or hub portion of the wheel is very important as the metallic hub carrying the bearings is of standard size and can be applied with best results only when the central portion of the wheel is of the proper thickness to correspond with the engaging portions of the metal hub. Furthermore in the assemblage of the spokes it sometimes happens that the central portion of the wheel becomes bilged or blistered and consequently with the old type of machine it was practically impossible to face wheels of this character in an even and uniform manner.

Another objection to the former type of machine is the inability to quickly and accurately fasten the wheel after the same has been reversed, due largely to the fact that the metal felly band is provided with an inclined flange at one side only.

My machine, therefore, is designed to overcome all of the objections hereinbefore referred to and provide a machine in which the wheel is quickly and easily secured in a central position and operated upon from one side by a cutter head which may embody a boring, a chamfering and a facing tool, and then, without removing the wheel from the machine operate upon the opposite face of the wheel by means of a second cutter head thereby performing the two facing operations in quick succession, or simultaneously if desired, and without removing the wheel from the machine.

It is also an object of the invention to so regulate the movement of the cutter heads that the opposite faces of the wheel will be faced off just a sufficient amount to leave the central portion of uniform thickness and both faces perfectly parallel. Another object of the invention is to provide for the balancing of the operative parts whereby one man can quickly and easily operate the machine.

With these objects in view, and certain other which will appear hereinafter as the description proceeds, the invention consists in the various novel features of construction and combination, all of which will be fully described and set forth in the appended claims.

Figure 15:
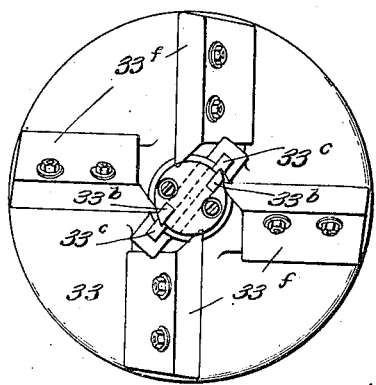
Figure 9:
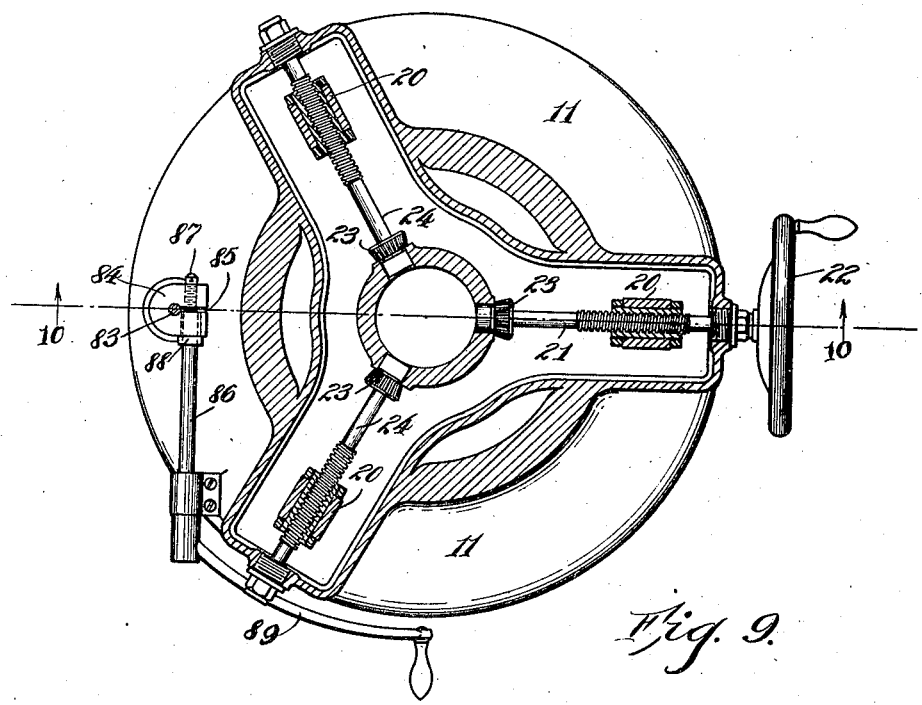
Figure 10:
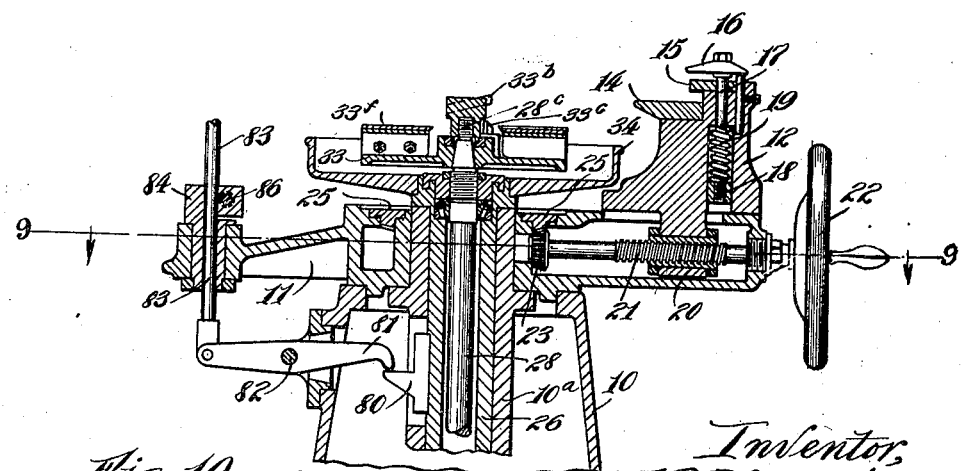

In the drawings forming a part of this specification, Fig. 1 is a view illustrating the manner of assembling the spokes and felly sections; Fig. 2 is a view showing the assembled wheel body in the compression clamp; Fig. 3 is a detail view illustrating the false hub in connection with the wheel body and Fig. 4 an elevation of the wheel body supported in position for finishing off the felly or peripheral portions of the wheel body; Fig. 5 is a side elevation of a machine embodying one form of my invention; Fig. 6 is a front view of the same; Fig. 7 is a vertical sectional view of the mechanism contained within the lower half of the main frame and by means of which the lower cutter head is operated; Fig. 8 is a vertical sectional view illustrating the means for operating the upper cutter head; Fig. 9 is a sectional plan view on the line 9—9 of Fig. 10 and illustrating the mechanism for clamping the wheel in the machine and Fig. 10 is a vertical sectional view on the line 10—10 of Fig. 9; Fig. 11 is a detail sectional view on the line 11—11 of Fig. 8 and Fig. 12 is a section on the line 12—12 of Fig. 7; Fig. 13 is a sectional view on the line 13—13 of Fig. 5 and Fig. 14 is a sectional elevation on the line 14—14 of Fig 13. Fig. 15 is a face view of a cutter head.

In the practical embodiment of my invention I employ a cast metal frame having a broad base providing a firm foundation, the frame being of such shape as to provide a pedestal and a curved central overhanging portion. The mechanism for operating the lower cutter head is contained within the pedestal portion while the mechanism for carrying and operating the upper cutter head is contained within the upper or overhanging portion of the main frame. Resting upon the pedestal portion of the main frame is a circular table or support 11, carrying a plurality of adjustable clamping members 12, three being preferred, the bases 13 of which are dove-tailed and slide in dove-tailed grooves or guideways cut in the horizontal table or support 11. Each clamp member 12 has a horizontal rest portion 14 upon which the felly of the wheel is adapted to rest, and contacting with the felly band or rim is a plate 15, and overhanging the felly band or rim is a finger 16, carried upon the end of a bolt 17 which passes vertically down through the member 12 and is provided with a nut 18 at its lower end for holding in place the coil spring 19 surrounding the lower end of the bolt, which spring tends to draw the bolt downward and hold the finger 16 firmly against the felly band or rim of the wheel. When it is desired to release the wheel it is only necessary to pull the finger 16 upwardly and give the same a turn sufficiently to disengage it from the felly band or rim; and in order to bring it into engagement it will of course only be necessary to reverse these operations. In order to move the clamping members radially in and out and at the same time simultaneously, each clamping member 12 is formed with a depending bored and threaded portion 20 which works in a slot in the table or support 11 and working in one depending member 20 is a threaded shaft 21 having a hand wheel 22 upon its outer end, so that, by turning the hand wheel in the desired direction the clamping member 12 can be moved in or out as desired and for the purpose of causing the other two clamping members to move radially inward or outward at the same time, and the same distance, I provide a bevel gear 23 upon the end of said shaft 21, which bevel gear meshes with a toothed ring 25 and the other shafts 24 are each provided with a bevel gear 23 which also meshes with the toothed ring 25, the outer ends of these shafts 24 turning in suitable bearings placed in the sides of the table or support 11. It is obvious, therefore, that by turning the hand wheel 22 in one direction all of the clamping members will be moved outwardly, and by turning the hand wheel in the opposite direction all of the clamping members will be moved inwardly the same distance and by this mechanism it is possible to quickly and easily clamp the wheel in the machine and properly center the same.

The pedestal portion of the main frame is formed with a depending circular portion 10$^a$ in which is located a tubular spindle or quill 26 having a flange or shoulder 27 at its upper end and which rests upon the central portion of the frame and supports the said tubular spindle or quill within the same. Working in this tubular spindle or quill 26 is a solid spindle 28 having the threaded portion 28$^a$ adjacent its upper end, the tapered portion 28$^b$ and threaded end 28$^c$. This spindle 28 has upper roller or ball bearings 29 and lower roller or ball bearings 30, the upper bearings being held in position by means of a nut or collar 31 secured upon the threaded portion 28$^a$ and seated in the upper or shouldered end of the quill, and the lower bearings 30 are held between the lower end of the quill and the collar or shoulder 32 formed upon the spindle 28; that portion of the spindle below the collar or shoulder 32 being somewhat reduced as shown.

The rotary cutter or cutter-head 33 is mounted upon the upper end of the spindle and preferably embodies the facing blades 33$^f$, the chamfering blades 33$^c$ and the boring blades 33$^b$, as most clearly shown in Fig. 15. The lower portion of the spindle passes through a circular plate 35 which is securely bolted to the lower end of the depending portion 10$^a$ and has a depending tubular extension 35ª and upon this extension is the pulley 36 having a bushing ring 37 secured in its upper end, which ring contacts with the depending central extension 35ª of the circular plate 35. The pulley 36 has anti-friction bearings 38 arranged therein and a collar 39 secured upon the lower end of the depending central portion 35ª maintains the pulley in its proper position.

A bearing 40 is secured by means of bolts 41 to the lower end of the pulley, the lower end of the bearing 40 extending into a cast metal oil receiving chamber 43 which is secured by bolts 44 to the depending central portion 10ª of the frame. The extreme lower end of the spindle 28 passes through the bearing 40 down into the oil receiving chamber, and a key 42 passes through this bearing into a longitudinal slot or keyway cut in the lower end of the spindle so that when the pulley is rotated the spindle will also be rotated, and by means of the key and slot said spindle can have a vertical movement simultaneous with its rotation. The oil receiving chamber 43 has an outlet 45 which communicates with the oil pump in a manner hereinafter explained.

For the purpose of raising and lowering the spindle and consequently the cutter head I provide a toothed segment 46 pivoted within the cast metal frame and having a hand operated lever 47 upon the exterior of the frame, this toothed segment meshing with a pinion 48 which in turn meshes with a rack 49 rigidly connected at one side of the quill 26 so that by working the hand lever 47 back and forth the quill and consequently the spindle and cutter head will be worked up and down as desired. A strap or cable 50 is connected to the end of the segment 46, passes over a pulley 51 within the cast metal frame and carries a weight 52 at its lower end acting as a counterbalance and rendering easy the operations of shifting the cutter head.

The upper or overhanging portion of the main frame is formed with the vertical portion 10ᶜ within which is mounted a tubular spindle or quill 53, and within which is arranged the solid spindle 54, there being anti-friction bearings 55 at the lower end of the spindle and anti-friction bearings 56 at the upper end of the quill, the bearings at the lower end being held in place by a nut 58 and those at the upper end by the nut, or nuts 59. A bearing 60 is mounted upon the upper end of the vertical portion 10ᶜ and has an upwardly extending central portion 60ª, and mounted upon this upwardly extending portion 60ª is the pulley 61, said pulley having a casting 62 bolted thereon and to this casting is secured a thimble or cap 63 which envelops the upper end of the spindle 54, said spindle working through the casting 62, in which is located the key 64 engaging the keyway 65 cut in the spindle.

The pulley 61 has anti-friction bearings, the lower bearings being held in place upon a shoulder formed at the lower end of the extension 60ª while the upper bearings are held in place by means of a ring secured upon the end of said extension. The casting 62 is chambered at 62ª and the bearing 60 has an annular chamber 60ᵇ so that lubricant injected into the chamber 62ª can pass through the bearings and accumulate in the chamber 60ᵇ.

The spindle is raised and lowered by raising and lowering the quill 53 and this is accomplished by means of a pinion 65 having the hand wheel 66 upon the end of its shaft, said pinion 65 meshing with a rack 67 formed upon one side of the quill 53 and by turning the hand wheel 66 the upper rotary cutter can be raised or lowered as desired. A strap or cable 68 is connected to the lower end of the quill and passes over pulleys 69 and 70 and carries a weight 71; sufficiently heavy to counterbalance the moving parts so that the rotary cutter can be quickly and easily raised or lowered when desired.

72 indicates a belt which passes around the pulley 61, over the idlers 73, beneath an idler 74, around a pulley 75, to the lower pulley 36 and back over the pulley 76, these pulleys 75 and 76 being mounted upon a shaft 100 journaled in a yoke or skeleton frame 79 bolted to the main frame at the rear thereof near the base and upon this shaft 100 are also the fast and loose main pulleys 77 and 78 which receive power from any suitable source.

In order to limit the upward movement of the lower cutter head I provide the lower quill 26 with a dog 80 working through an opening in the central portion 10ª and engaging the inner end of a lever 81 pivoted at 82 and connected at its outer end to the lower end of a rod 83 which passes upwardly through a bushing 84 located in the support 11 and split at 85. Working through the split portion of the bushing is the horizontal rod 86 threaded at 87 and provided with a shoulder 88 so that by turning the rod 86 the bushing can be expanded or contracted so as to permit the adjustment of the rod 83 or hold the same locked and a crank handle 89 is attached to the end of the shaft 86 for the purpose of operating the same. This crank handle is curved so as to place the free end thereof within convenient reach of the operator. When the dog 80 contacts with the lever 81 it pulls down upon the rod 83 and the upper end of this rod is connected to a lever 90 pivoted at 91 to an arm or projection and engaging at its inner end a movable bushing 92 through which works a rod 93 connected at its lower end to the guard surrounding the upper cutter head. The upper end of this rod is threaded as shown at 94 and carries a nut or nuts 95 thereon which nuts act as a stop when contact is had with the bushing 92 through which the rod 93 works and the upward movement of the lever 90 determines with the stop 95 the point at which the upper cutter head will be stopped and it is obvious that by connecting the levers 81 and 90 by means of the rod 83 these stop mechanisms will operate in unison and serve to maintain the uniformity of trim or facing accomplished by the rotary cutters. By loosening the split bushing the rod 83 can be adjusted as desired and by the adjustment of this rod the stopping positions of both the upper and lower cutter heads are determined.

Upon the end of the shaft 100 carrying the belt pulleys previously referred to, there is mounted a pinion 101 driving a gear 102 which has a central slideway 103 in which works the wrist pin 104 to which is attached the connecting rod 105 which works the piston 106 in the oil pump cylinder 107, the oil feed pipe 108 leading from said cylinder to the inlet passage 109 produced in the casting 60 and communicating with the passage 110, which leads up and discharges into the chamber 62$^a$ and from which oil passes to the pulley bearings and collects in the annular chamber 60$^b$ formed also in the casting 60.$^c$ A tube 111 conducts the oil from the chamber 60$^b$ to the funnel 112, the spout 113 of which discharges into an opening leading into the upper bearings of the upper spindle, and after lubricating these bearings the oil passes down to the lower bearings and out through a port 114 into the annular chamber 115 from whence it escapes through a flexible pipe or tube 116, and this pipe or tube conducts the lubricant to the opening 117 in the lower quill and there it lubricates the upper and lower bearings of the lower spindle. It then passes down through the openings 118 in the plate 35, lubricates the pulley 36, collects in the chamber 119 in the casting 40, and finally passes through the openings 120 into the oil receiving chamber 43 from which it is drawn off by the pipe or tube 121 to the intake port of the cylinder 107. By this system, all of the moving parts are kept well lubricated all the time and the power which drives these moving parts is utilized to pump the oil to keep up the lubricant circulation.

Having thus described my invention, what I claim is:

1. In a machine of the kind described, the combination with a wheel support, of a vertically movable lower rotary cutter, a vertically movable upper rotary cutter, an adjustable stop device arranged upon the support and adapted to stop the lower rotary cutter at a predetermined point of its vertical movement, and an adjustable stop device for stopping the upper rotary cutter at a predetermined point of its vertical movement, said stop devices being connected together.

2. The combination with a table and adjustable support, of a lower rotary cutter and means for moving the same, an upper rotary cutter and means for moving the same, stops for said cutters, levers engaged by said stops, a rod connecting said levers, and adjustable means carried by said table for positioning said rod.

3. The combination with a table, of a vertically adjustable rod and means for connecting said rod to said table, levers connected to opposite ends of said rod, and rotary cutters having stops adapted to engage said levers as set forth.

4. In a machine of the kind described, the combination with a horizontal table, of adjustable means carried by said table for engaging the peripheral portions of a wheel body, a pair of vertical and oppositely disposed rotary cutters movable toward and from each other to operate upon said wheel body, stops for each of said cutters and a connection between said stops for controlling the operation of one from the other.

5. In a machine of the kind described, the combination with a horizontal table, of a plurality of wheel clamping members arranged thereon, an upper rotary cutter for operating upon one side of a wheel body, a lower rotary cutter projecting up through said table for simultaneously operating upon the other side of said wheel body and means for stopping one of said cutters from the other.

6. In a machine of the kind described, the combination with a main frame, of a horizontal table mounted thereon, a plurality of wheel clamping members arranged on said table, a pair of oppositely disposed sleeves slidably mounted on said frame, a spindle journaled in each of said sleeves for rotation, a cutting member mounted on each of said spindles for operating upon a wheel body, and a stop device connected to each of said sleeve members for controlling the operation of one from the other.

7. The combination with a stationary table for supporting a wheel, of a cutter for facing one side of the wheel body, means for moving said cutter toward the wheel body to different cutting positions, a cutter for facing the opposite side of the wheel body, means for moving said last-mentioned cutter toward the wheel body to different cutting positions, and adjustable connected stops for limiting the movements of said cutters toward each other.

8. The combination with a stationary table for supporting work, of cutters for facing opposite sides of the work, means for moving each of said cutters toward the other though various distances, and means dependent upon the movement of one of said cutters toward the other for limiting the movement of the other cutter toward the first-mentioned cutter.

9. The combination with a stationary horizontal table for supporting a wheel body, of cutters adjustable vertically toward each other and adapted to face the upper and lower sides of the wheel body, and adjustable stops for limiting the movement of said cutters toward each other.

10. The combination with a stationary table for supporting work, of tools on opposite sides of the work adjustable toward each other, and connected stops for limiting the movement of said tools toward each other.

11. The combination with a table, of a longitudinally adjustable rod and means for securing said rod in its positions of longitudinal adjustment to said table, and rotary cutters movable toward each other and having stops cooperating with said rod for limiting their movements toward each other.

12. In a machine of the kind described, the combination with a main frame, of a stationary horizontal table mounted thereon, means upon said table for clamping the wheel, a pair of oppositely disposed sleeves vertically slidable in said frame, a spindle journalled in each of said sleeves for rotation, a cutter mounted on each of said spindles, said spindles and cutters being movable with said sleeves, racks upon said sleeves, rotatable toothed members engaging said racks for reciprocating said sleeves, and stops connected to said sleeves for limiting the movement thereof.

In testimony whereof, I hereunto affix my signature.

AUGUST E. R. BLOMQUIST.